Figure 6:
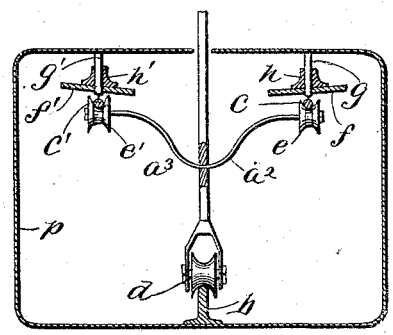
Figure 7:
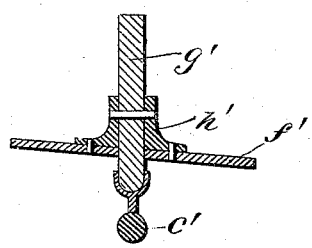
Figure 8:
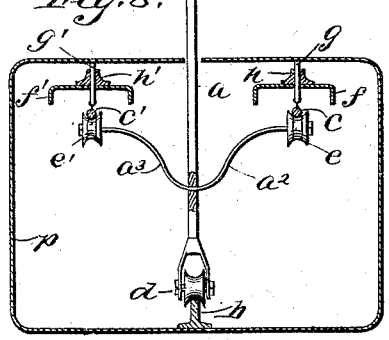
Figure 9:
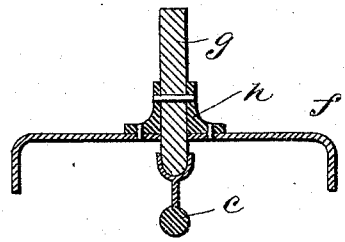

(No Model.) 2 Sheets—Sheet 1.
C. O. EHLERT.
CONDUIT ELECTRIC RAILWAY.
No. 505,081. Patented Sept. 12, 1893.
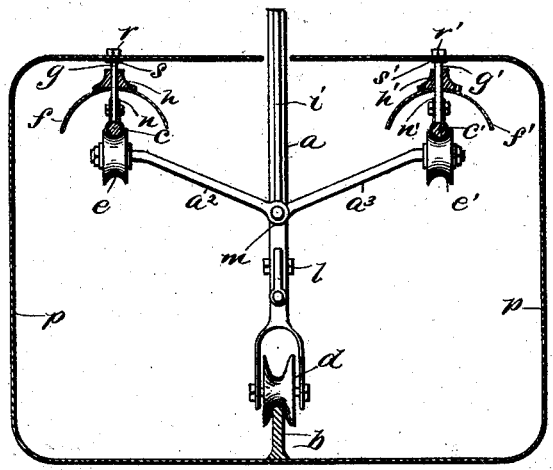
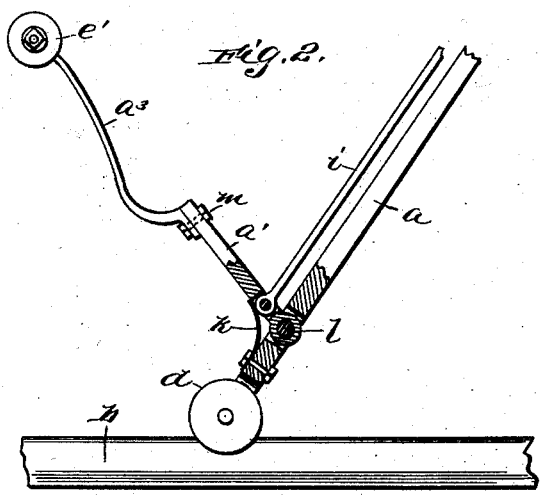
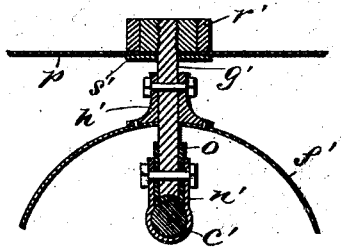
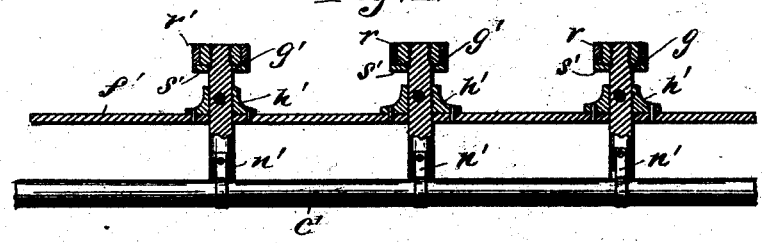
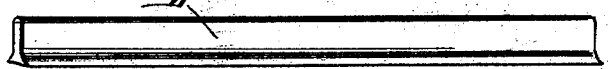
Witnesses
H. Fowler
L. H. Richards.
Inventor:
Chas. O. Ehlert (No Model.) 2 Sheets—Sheet 2.

C. O. EHLERT.
CONDUIT ELECTRIC RAILWAY.

No. 505,081. Patented Sept. 12, 1893.

Witnesses:
H. Fischer
L. H. Richards.

Inventor:
Chas. O. Ehlert.

UNITED STATES PATENT OFFICE.

CHARLES O. EHLERT, OF NEW YORK, N. Y.

CONDUIT ELECTRIC RAILWAY.

SPECIFICATION forming part of Letters Patent No. 505,081, dated September 12, 1893.

Application filed August 23, 1892. Serial No. 443,926. (No model.)

*To all whom it may concern:*

Be it known that I, CHARLES O. EHLERT, a citizen of the United States, residing at the city of New York, county of New York, State of New York, have invented certain new and useful Improvements in Underground Conduits for Electric Railways, of which the following is a specification.

My invention relates to improvements in underground conduits for electric railways in which electric conductors are secured to receive contact from a trolley arm bearing directly down upon them, and the objects of my improvements are, first, to provide a trolley arm mounted on a grooved iron trolley wheel, having one or more branch or fork arms bent upward and engaging contact by suitable means with the under side of suitable electric conductors secured within an underground conduit for electric railways; second, to provide an iron trolley guide or center rail secured within and extending longitudinally through the said conduit to guide the above trolley arm having branch or fork arms and mounted on a grooved iron trolley wheel; third, to provide protecting hoods or shields secured over or above the electric conductors secured within an underground conduit for electric railways to prevent water or moisture from dripping down upon the said electric conductors. I attain these objects by the mechanisms illustrated in the accompanying drawings.

Figure I is a cross section of the forked trolley arm mounted on a grooved iron trolley wheel, of the iron trolley guide or center rail, of the protecting hoods or shields and electric conductors as applied to a suitable underground conduit for electric railways. Fig. II. is an elevation of forked trolley arm; Fig. III. enlarged cross section of electric conductors and protecting hoods or shields showing the manner of securing them; Fig. IV. a longitudinal section of electric conductors and protecting hoods or shields secured above them. Fig. V. is a perspective of the iron trolley guide or center rail. Fig. VI. shows a cross section of protecting hoods or shields constructed as having a plane or level surface, as applied to a suitable underground conduit for electric railways; Fig. VII. an enlarged cross section of shields shown in Fig. VI. Fig. VIII. shows a cross section of protecting hoods or shields having their sides or edges bent downwardly, as applied to a suitable conduit for electric railways; Fig. IX. an enlarged cross section of shields shown in Fig. VIII.

$a$. is a trolley arm mounted on a grooved iron trolley wheel $d$. to travel along or over the iron trolley guide or center rail $b$. and having the branch or fork arms $a^2$ and $a^3$ bent upward and secured to the short arm $a'$ which is itself secured to the main trolley arm $a$.; the trolley arm $a$. is clamped or secured by suitable means to the truck of an electric car and pressed downward upon the iron trolley guide or center rail $b$.; by the use of the forked trolley arm $a$. the electric conductors can be secured within the underground conduit for electric railways as far from the bottom and from the longitudinal slot of said conduit as possible and thus lessen the liability of the said electric conductors getting short circuited by water or moisture.

$a'$ is a short arm to which is secured at its upper end the fork or branch arms $a^2$ and $a^3$ bent upward and the lower end of $a'$ is loosely secured or mounted on the main trolley arm $a$ to allow a flat steel spring $k$. to press said arm $a'$ upward and cause contact between the electric conductors $c$. and $c'$. and the grooved contact trolley wheels $e$. and $e'$.

$a^2$. and $a^3$. are fork or branch arms secured to the upper end of the short arm $a'$. and bent upward and diverge from each other as they extend upward to come in contact with the electric conductors $c$. and $c'$.; on the upper end of each fork or branch arm are insulated and mounted the grooved contact trolley wheels $e$ and $e'$; if desired the fork or branch arms $a^2$. and $a^3$. may be made in one or more sections.

$b$. is a thin iron or steel trolley guide or center rail secured within and extending longitudinally through an underground conduit for electric railways, independently and separate from the electric conductors secured therein, to receive and guide the trolley arm $a$. The said trolley guide or center rail $b$. is secured to the bottom of said conduit, in alignment, as perfect as possible, with the longitudinal slot of said conduit. It is not intended that said trolley guide or center rail $b$. shall sustain the weight of trolley arm $a$ as much as it is intended to guide the said trolley arm $a$ and prevent it from wabbling and thus permitting the fork or branch arms $a^2$ and $a^3$ to engage with an even and equal contact with the under side of suitable electric conductors secured within the said conduit.

$c$ and $c'$. are electric conductors secured to the lower ends of standards $g$ and $g'$ by the metal straps $n$ and $n'$ to receive contact on their under sides; the said conductors $c$ and $c'$ and straps $n$ and $n'$ are electrically insulated from the standards $g$ and $g'$ and are placed within the said conduit as far from the bottom and from the longitudinal slot of said conduit as convenient to receive contact from the grooved contact wheels $e$ and $e'$; if desired the electric conductors may be suspended in the said conduit from insulators similar to those used in overhead systems of electric railways.

$d$ is a grooved iron trolley wheel of suitable size and mounted on the lower end of the trolley arm $a$ to travel along or over the iron trolley guide or center rail $b$.

$e$. and $e'$. are grooved contact trolley wheels of copper or other suitable conductor of electricity, insulated and mounted on the upper ends of the fork or branch arms $a^2$. and $a^3$. to engage contact with the under side of electric conductors $c$ and $c'$; from each grooved contact trolley wheel is extended suitably insulated covered wires or conductors of electricity and connected with the terminals of electric motors secured to the car.

$f$ and $f'$ are protecting hoods or drip shields secured above the electric conductors; the said shields need not necessarily be concave. They may also be constructed as having a plane or level surface as shown in Fig. VII, or may be constructed as having sides or edges bent downwardly as shown in Fig. IX. The shields $f$ and $f'$ are of sufficient width to catch or prevent drippings of water or moisture that may leak or trickle from that part of the conduit directly over the electric conductors from falling or dripping upon the said conductors; the said protecting hoods or drip shields are secured above the electric conductors throughout their entire length, to the standards $g$ and $g'$ by suitable brackets $h$ and $h'$.

$g$ and $g'$ are suitable standards to support the electric conductors $c$ and $c'$ and the protecting shields $f$ and $f'$ and are secured at suitable distances apart throughout the conduit, said standards having shoulders on which the ring washers $s$, $s'$ rest and the upper ends threaded to receive screw nuts $r$, $r'$.

$h$ and $h'$ are suitable brackets to which the protecting hoods or shields $f$ and $f'$ are suitably secured; the said brackets may be angle pieces of metal and secured to the standards $g$ and $g'$ to suspend or place the protecting hoods or shields $f$ and $f'$ above or over the electric conductors $c$ and $c'$.

$i$ is a suitable lever loosely mounted on the short arm $a'$ and adapted to break the electric connection, when desired by pressing the short arm $a'$ down and causing the grooved contact trolley wheels $e$ and $e'$ to leave the electric conductors $c$ and $c'$.

$k$. is a flat steel spring secured at one end to the trolley arm $a$ below the short arm $a'$ and adapted to press the said short arm $a'$ upward.

$l$. is a bolt or other suitable means by which the short arm $a'$ is loosely mounted or secured to the main trolley arm $a$.

$m$. are bolts or screws to secure the fork or branch arms $a^2$ and $a^3$ to the upper end of short arm $a$.

$n$ and $n'$ are suitable straps of thin sheet metal, preferably of brass or copper, bent U shape to secure the electric conductors $c$ and $c'$ to the lower ends of the standards $g$ and $g'$.

$o$ is a mica or other suitable insulating material to insulate the electric conductors $c$ and $c'$ and the straps $n$ and $n'$ from the standards $g$ and $g'$.

$p$. is a suitable underground conduit for electric railways having a longitudinal slot and suitable drain pipes to carry off accumulated water.

$r$ and $r'$ are ordinary nuts to secure the standards $g$ and $g'$ within the conduit.

$s$ and $s'$ are suitable iron washers resting on shoulders of standards $g$ and $g'$ to keep said standards rigid when screw nuts $r$, $r'$ are screwed down.

Having fully described my invention, what I claim, and desire to secure by Letters Patent, is—

1. The combination in an underground conduit for electric railways, of the main trolley arm $a$ mounted on a grooved iron trolley wheel $d$, of an iron trolley guide or center rail secured within and extending longitudinally through the said conduit to guide the trolley arm $a$, of the short arm $a'$ loosely mounted or secured to the main trolley arm $a$, of the flat steel spring $k$ adapted to press the short arm $a'$ upward and of the diverging fork or branch arms $a^2$ and $a^3$ secured to the upper end of short arm $a'$ and bent upward, having grooved contact trolley wheels $e$ and $e'$ mounted and insulated on their upper ends to engage contact with the under side of suitable electric conductors secured within said conduit, as shown and described.

2. The combination in an underground conduit for electric railways, of the main trolley arm $a$ mounted on a grooved iron trolley wheel $d$, of the short arm $a'$ loosely mounted or secured to the main trolley arm $a$ and pressed upward by the spring $k$, of the diverging fork or branch arms $a^2$ and $a^3$ secured to the upper end of short arm $a'$ and bent upward, having the grooved contact trolley wheels $e$ and $e'$ mounted and insulated on their upper ends to engage contact with the under side of electric conductors $c$ and $c'$ secured to the standards $g$ and $g'$ by the straps $n$ and $n'$ and of an iron trolley guide or center rail $b$. secured within and extending longitudinally through the said conduit to guide the main trolley $a$ and keep it in alignment with the longitudinal slot of said conduit and to permit the diverging fork or branch arms $a^2$ and $a^3$ of main trolley arm $a$ to give even and equal contact on the under side of conductors $c$ and $c'$ substantially as shown and described.

3. In an underground conduit for electric railways, the combination of the trolley guide $b$, of a main trolley arm $a$, of short arm $a'$, of branch or fork arms $a^2$ and $a^3$ engaging contact with the electric conductors, and the drip shields $f$ and $f'$ having a concave or plane surface, secured above the electric conductors, as shown and described.

4. An underground conduit for electric railways, provided with suitable electric conductors, having the protecting hoods or shields $f$ and $f'$ secured above them, an iron trolley guide or center rail $b$. secured within and extending longitudinally through the said conduit, of a main trolley arm $a$ mounted on a grooved iron trolley wheel $d$ to travel over the said trolley guide or center rail $b$., and having the short arm $a'$ loosely mounted or secured to the main trolley arm $a$ and pressed upward by spring $k$, the lever $i$ to control the short arm $a'$, the diverging fork or branch arms $a^2$ and $a^3$ secured to the upper end of said short arm $a'$ and bent upward, having the grooved contact trolley wheels $e$ and $e'$ mounted and insulated on their upper ends to engage contact with the under side of said electric conductors secured within the said conduit substantially as shown and described.

5. In an underground conduit for electric railways, the combination of a trolley guide, of a main trolley arm mounted on a grooved trolley wheel, of branch or fork contact arms secured thereto and pressed or actuated by springs to engage contact with the electric conductors, and the protecting hoods or drip shields $f$ and $f'$, substantially as shown and described.

6. In an underground conduit for electric railways, the combination of protecting hoods or drip shields secured above the electric conductors, of a main or supporting trolley arm, of short arm $a'$ secured thereto and pressed or actuated by springs, and of branch or fork contact arms $a^2$ and $a^3$ secured to short arm $a'$ to engage contact with the conductors, substantially as set forth.

In testimony whereof I have hereunto subscribed my name this 18th day of August, A. D. 1892.

CHAS. O. EHLERT.

Witnesses:
FRED NELSON,
WILLIAM NAHRWOHL.